United States Patent
Weis et al.

(10) Patent No.: US 10,929,270 B2
(45) Date of Patent: Feb. 23, 2021

(54) SYSTEM AND METHOD FOR CONTROLLED DATA EXTRACTION IN COMPUTER NETWORKS

(71) Applicant: ROOKOUT LTD., Tel Aviv (IL)

(72) Inventors: Or Weis, Tel Aviv (IL); Liran Haimovitch, Givatayim (IL)

(73) Assignee: ROOKOUT LTD., Tel Aviv (IL)

( * ) Notice: Subject to any disclaimer, the term of this patent is extended or adjusted under 35 U.S.C. 154(b) by 0 days.

(21) Appl. No.: 16/237,698

(22) Filed: Jan. 1, 2019

(65) Prior Publication Data

US 2019/0205242 A1 Jul. 4, 2019

Related U.S. Application Data

(60) Provisional application No. 62/612,641, filed on Jan. 1, 2018, provisional application No. 62/757,191, filed on Nov. 8, 2018.

(51) Int. Cl.
| | |
|---|---|
| G06F 9/44 | (2018.01) |
| G06F 11/36 | (2006.01) |
| G06F 16/25 | (2019.01) |
| H04L 12/26 | (2006.01) |
| G06F 8/70 | (2018.01) |
| G06F 11/34 | (2006.01) |
| G06F 11/30 | (2006.01) |

(52) U.S. Cl.
CPC .......... *G06F 11/3636* (2013.01); *G06F 8/70* (2013.01); *G06F 11/3006* (2013.01); *G06F 11/3466* (2013.01); *G06F 11/36* (2013.01); *G06F 11/3612* (2013.01); *G06F 11/3644* (2013.01); *G06F 11/3664* (2013.01); *G06F 16/254* (2019.01); *H04L 43/12* (2013.01); *G06F 2201/86* (2013.01); *G06F 2201/865* (2013.01)

(58) Field of Classification Search
CPC ............. G06F 11/3636; G06F 11/3656; G06F 11/3668; G06F 11/3672
USPC .................................................. 717/124–130
See application file for complete search history.

(56) References Cited

U.S. PATENT DOCUMENTS 5,461,570 A * 10/1995 Wang ........................ A61L 2/24
700/110
5,550,803 A * 8/1996 Crayford ................. H04L 12/44
370/246

(Continued)

OTHER PUBLICATIONS

Zhai et al, "Web Data Extraction Based on Partial Tree Alignment", ACM, pp. 76-85 (Year: 2005).*

(Continued)

*Primary Examiner* — Anil Khatri
(74) *Attorney, Agent, or Firm* — Pearl Cohen Zedek Latzer Baratz LLP

(57) ABSTRACT

Methods and systems for controlled data extraction in a computer network, with: monitoring data from at least one program running on a node of the computer network, determination of at least one data portion from the monitored data, where the data portions are selected upon identification of at least one of: application and server events, code line execution, file access and data calls, moving of the determined at least one data portion to a data sink, analyzing of the data on the data sink to determine at least one segment for modification, and modifying the at least one segment.

20 Claims, 7 Drawing Sheets

(56) References Cited

U.S. PATENT DOCUMENTS

| | | | | |
|---|---|---|---|---|
| 5,903,757 A * | 5/1999 | Gretz | ................. | G06F 11/3409 714/E11.192 |
| 6,115,393 A * | 9/2000 | Engel | ................. | H04L 41/0213 370/469 |
| 6,182,243 B1 * | 1/2001 | Berthe | ................ | G06F 11/3476 714/38.11 |
| 6,847,393 B2 * | 1/2005 | Ashe | ....................... | G07G 1/14 348/143 |
| 7,051,197 B2 * | 5/2006 | Agarwala | ........... | G06F 11/3636 700/26 |
| 7,089,530 B1 * | 8/2006 | Dardinski | ........ | G05B 19/41845 717/105 |
| 7,367,025 B1 * | 4/2008 | Nikolov | .............. | G06F 11/3624 714/E11.207 |
| 7,424,705 B2 * | 9/2008 | Lewis | ................. | G06F 9/45516 717/148 |
| 7,475,088 B2 * | 1/2009 | Ziegler | ................. | G06F 16/254 |
| 7,900,201 B1 * | 3/2011 | Qureshi | ................. | G06N 5/048 717/174 |
| 8,006,231 B2 * | 8/2011 | Peipelman | .......... | G06F 11/3668 717/124 |
| 8,220,054 B1 * | 7/2012 | Lu | ....................... | G06F 21/566 726/24 |
| 8,370,812 B2 * | 2/2013 | Feblowitz | ................ | G08G 1/04 717/126 |
| 8,396,960 B2 * | 3/2013 | Martinez | ................. | H04L 69/14 709/224 |
| 8,397,111 B2 * | 3/2013 | Hogstrom | ............ | G06F 11/366 714/718 |
| 8,555,253 B2 * | 10/2013 | Shufer | ................ | G06F 11/3668 717/125 |
| 8,707,274 B2 * | 4/2014 | Rochette | ............ | G06F 11/3636 717/128 |
| 8,752,027 B2 * | 6/2014 | Noureddine | ........ | G06F 11/3688 717/130 |
| 8,775,769 B2 * | 7/2014 | Li | ......................... | G06F 11/366 711/173 |
| 9,027,025 B2 * | 5/2015 | Zoll | .................... | G06F 11/3409 718/100 |
| 9,378,034 B2 * | 6/2016 | Matov | ................. | G06F 9/45525 |
| 9,767,006 B2 * | 9/2017 | Krajec | ............... | G06F 11/3433 |
| 9,804,949 B2 * | 10/2017 | Krajec | ............... | G06F 11/3644 |
| 10,049,136 B1 * | 8/2018 | Barsness | ........... | G06F 16/24568 |
| 2005/0138642 A1 | 6/2005 | Breh et al. | | |
| 2008/0141224 A1 | 6/2008 | Kawasaki et al. | | |

OTHER PUBLICATIONS

Wang et al, "Data Extraction and Label Assignment for Web Databases", ACM, pp. 187-196 (Year: 2003).*

Romanovsky et al, "Except for Exception Handling . . . ", ACM, pp. 19-25 (Year: 2001).*

Xie et al, "Making Exceptions on Exception Handling", IEEE, pp. 1-3 (Year: 2012).*

Asheibi et al, "Analyzing Harmonic Monitoring Data using Data Mining", ACM, pp. 63-68 (Year: 2006).*

Kuehn et al, Monitoring Data Streams at Process Level in Scientific Big Data Batch Clusters, IEEE, pp. 90-95 (Year: 2014).*

Santelices et al, "Efficiently Monitoring Data-Flow Test Coverage", ACM, pp. 343-352 (Year: 2007).*

Neill, "Expectation-based scan statistics for monitoring spatial time series data", International Journal of Forecasting, pp. 498-517 www.sciencedirect.com (Year: 2009).*

Guo et al, "Tracking Probabilistic Correlation of Monitoring Data for Fault Detection in Complex Systems", IEEE, pp. 1-10 (Year: 2006).*

Baumgartner et al, "Scalable Web Data Extraction for Online Market Intelligence", ACM, pp. 1512-1523 (Year: 2009).*

Myllymaki et al, "Effective Web Data Extraction with Standard XML Technologies", ACM, pp. 689-696 (Year: 2001).*

European Search Report of Application No. EP19150050.3 dated Sep. 11, 2019.

* cited by examiner

SYSTEM AND METHOD FOR CONTROLLED DATA EXTRACTION IN COMPUTER NETWORKS

CROSS REFERENCE TO RELATED APPLICATION

This application claims the benefit of U.S. Provisional Patent Application No. 62/612,641, filed Jan. 1, 2018, and U.S. Provisional Patent Application No. 62/757,191, filed Nov. 8, 2018, the entire contents of which are incorporated herein by reference in their entireties.

FIELD OF THE INVENTION

The present invention relates to computer networks. More particularly, the present invention relates to systems and methods for controlled data management and extraction in computer networks.

BACKGROUND OF THE INVENTION

Software engineers that want to analyze or modify their code are currently required to use multiple tools to collect data from different sources and for different purposes, for example logging code segments and/or libraries inside the system, using exception management software development kits (SDKs) for collection of exceptions, etc. Since the majority of code development and deployment processes have long and slow cycles, the typical solution for code analysis and/or modification is to retrieve a segment of the code (e.g., with a snapshot). However, even such solutions cannot be applied to all portions of code since some segments cannot be retrieved by the remote engineer and therefore lacking simple and agile data extraction.

Some data collection includes a dedicated application program interface (API) and/or dedicated SDK supplied by the data target so that data is transformed, and the final target is then determined in the collection layer itself. Data may also be collected to a temporary target (e.g., file or queue) with a second, separate stage (such as an extract, transform and load-ETL process) is used to transform the data and load it to its final target.

SUMMARY OF THE INVENTION

There is thus provided, in accordance with some embodiments of the invention, a method of controlled data extraction in a computer network, the method may include: monitoring, by a processor, data from at least one program running on a node of the computer network, determining, by the processor, at least one data portion from the monitored data, in accordance with at least one first rule, wherein data portions determined in accordance with the at least one first rule are selected upon identification of at least one of: application and server events, code line execution, file access and data calls, moving, by the processor, the determined at least one data portion to a data sink, analyzing, by the processor, the data on the data sink to determine at least one segment for modification, and modifying, by the processor, the at least one segment, in accordance with at least one second rule.

In some embodiments, the modified data may be sent to the corresponding at least one node of the computer network. In some embodiments, the at least one data portion may include a data exception. In some embodiments, the monitoring may be carried out on a dedicated node of the computer network. In some embodiments, at least one segment for modification may include an event identified in accordance with the at least one first rule.

In some embodiments, a dedicated processor may be embedded in the computer network to analyze the data therein. In some embodiments, the at least one first rule may include identification of at least one of type of source code and location in source code to determine data exceptions. In some embodiments, an alert may be issued upon detection of at least one event identified in accordance with the at least one first rule. In some embodiments, operation of the at least one node may be stopped upon detection of at least one event identified in accordance with the at least one first rule. In some embodiments, the monitoring may be carried out with at least one of: tracing, hooking, bytecode-manipulation and debugger interfaces, and wherein the bytecode-manipulation is interchangeable. In some embodiments, at least one of the following events may be monitored: performance profiling, error instrumentation, logging web events, application networking events, file system events, network traffic monitoring and container instrumentation operation.

There is thus provided, in accordance with some embodiments of the invention, a system for controlled data extraction in a computer network, the system may include: a processor, and at least one data sink, comprising at least one first rule and at least one second rule, wherein the processor is configured to: monitor data from at least one node of the computer network, determine at least one data exception, wherein data exceptions are selected from a group consisting of: application and server events, code line execution, file access and calls, move the monitored data to the data sink, analyze the data on the data sink to determine at least one segment for modification, and modify the at least one segment.

In some embodiments, the processor may be configured to monitor on a dedicated node of the computer network. In some embodiments, a dedicated processor may be embedded in the computer network to analyze the data therein. In some embodiments, at least one segment for modification may include an event identified in accordance with at least one first rule. In some embodiments, the at least one first rule may include at least one of type of source code and location in source code to determine data exceptions.

In some embodiments, the processor may be configured to stop operation of the at least one node upon detection of at least one event identified in accordance with the at least one first rule. In some embodiments, the processor may be configured to monitor with at least one of: tracing, hooking, bytecode-manipulation and debugger interfaces, and wherein the bytecode-manipulation is interchangeable. In some embodiments, at least one of the following events may be monitored by the processor: performance profiling, error instrumentation, logging web events, application networking events, file system events, network traffic monitoring and container instrumentation operation.

There is thus provided, in accordance with some embodiments of the invention, a method of controlled code modification in a computer network, the method may include: determining, by a processor, at least one code segment for modification from at least one program stored on a repository coupled to the processor, creating, by the processor, instructions for modification of the determined at least one code segment, sending, by the processor, instructions to be implemented on a node of the computer network, and modifying code in the computer network based on the instructions for modification. In some embodiments, implementation of the at least one modified segment may be carried out in real-time while the corresponding process keeps running.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
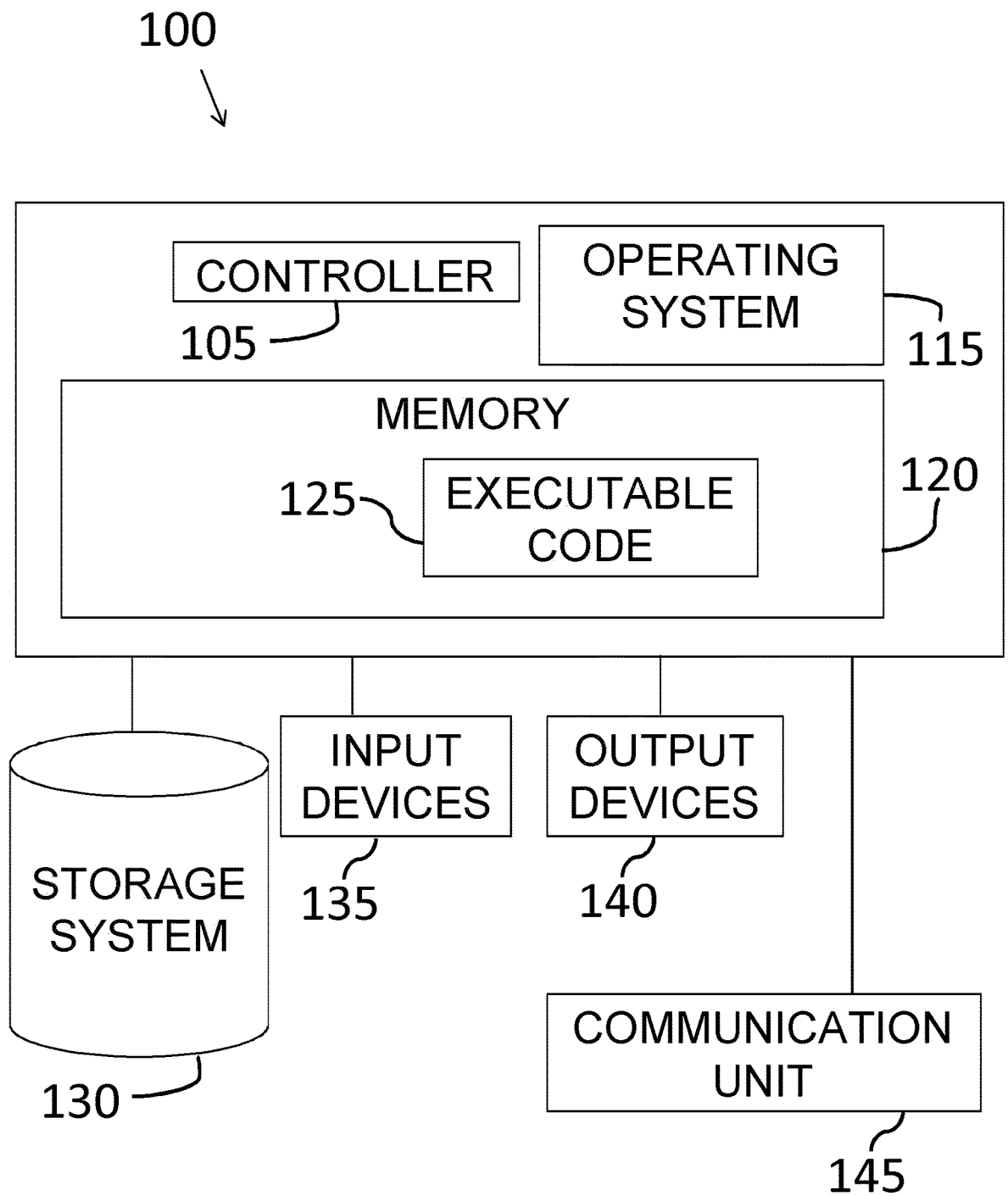
FIG. 1 shows a block diagram of an examplary computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices or the components shown in FIGS. 2A-2B. For example, system 200 may be, or may include, computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of: possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
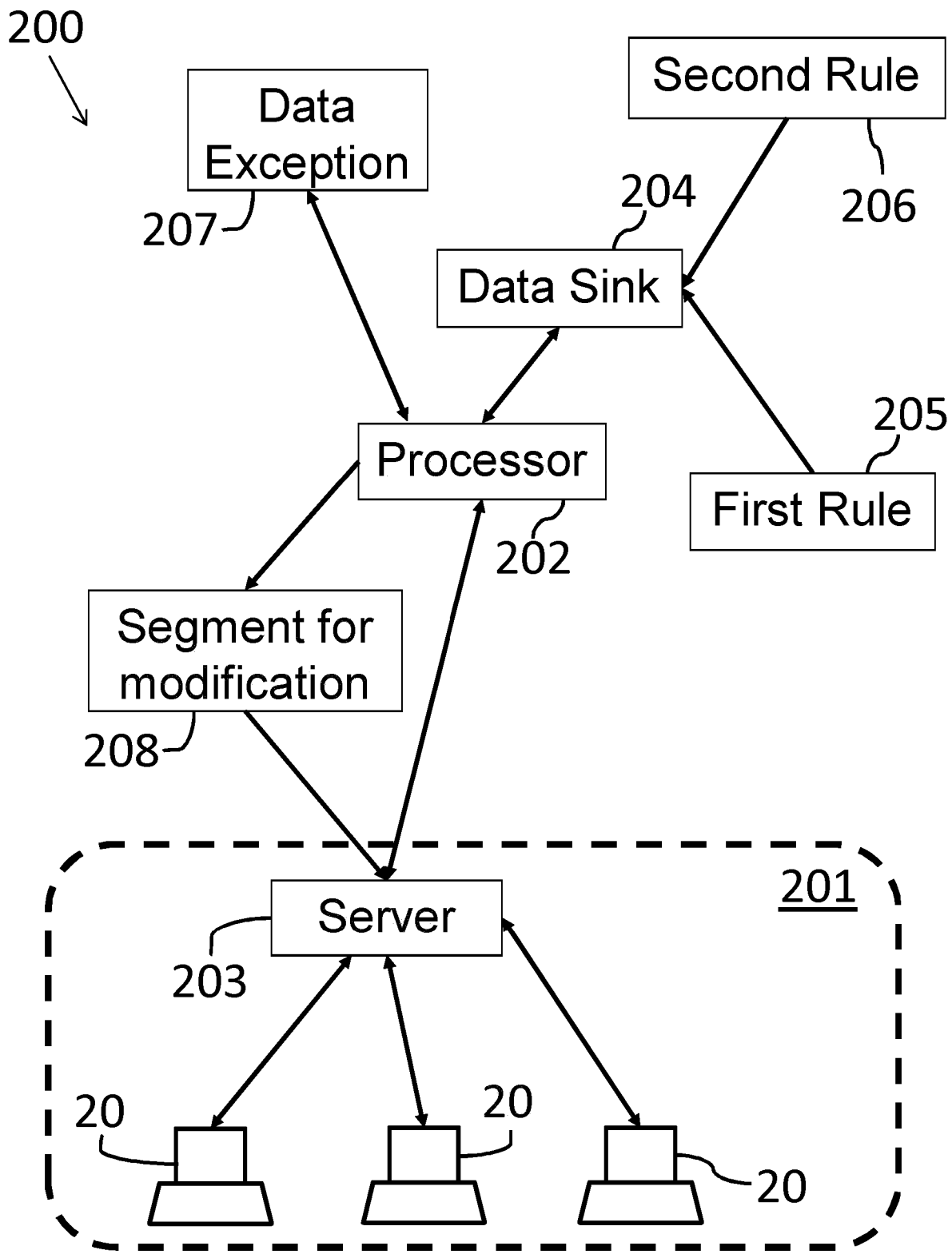
FIGS. 2A-2B show block diagrams of a system for controlled data extraction in a computer network, according to some embodiments of the invention.

Reference is now made to FIG. 2A, which shows a block diagram of a system 200 for controlled data extraction in a computer network 201, according to some embodiments. In FIG. 2A, the direction of arrows may indicate the direction of information flow.

According to some embodiments, system 200 may include a processor 202 (e.g., such as controller 105 shown in FIG. 1) in communication with at least one server 203 of computer network 201, such that data from various nodes 20 (e.g., such as computing device 100 shown in FIG. 1) of computer network 201 may be received for monitoring and/or analysis by processor 202 via the at least one server 203. In some embodiments, system 200 may include at least one data sink 204, coupled to the processor 202, and including at least one predetermined first rule 205 and/or at least one predetermined second rule 206.

In some embodiments, the predetermined first rule 205 may indicate that upon identification of at least one of: code line execution, method call, interface call, exception thrown, exception caught, exception not caught, file access, network activity, thread activity, and process activity the corresponding data portion may be selected for analysis (e.g., to determine of data modification is required). In some embodiments, the predetermined second rule 206 indicate that upon receipt of a data segment for modification, that data segment may be modified by at least one of: catching an exception, executing a line of code, skipping a line of code, executing a method, and setting a variable's value.

The processor 202 may be configured to monitor data from at least one node 20 of the computer network 201 and determine at least one data exception 207 in accordance with at least one predetermined first rule 205. In some embodiments, data exceptions 207 may be selected from a group consisting of: application and server events, code line execution, file access and data calls.

According to some embodiments, processor 202 may be configured to move the monitored data to the data sink 204, and analyze the data stored on the data sink 204 to determine at least one segment 208 (e.g., a segment with an exception). The determined at least one segment 208 may be later modified (e.g., to correct errors in the code), and the processor 202 may modify the at least one segment 208 in accordance with at least one predetermined second rule 206.

The modification of the at least one segment 208 may be carried out on a predetermined separate ETL layer. In some embodiments, modification of the at least one segment 208 may be carried out in real-time (e.g., in accordance with the rate of computer network 201) such that the corresponding process running in computer network 201 may be substantially unaffected.

According to some embodiments, processor 202 may be coupled to a dedicated server (e.g., a service server within computer network 201) in order to allow at least one of: managing data pipelines, a dedicated API, and/or a cloud data pipeline for processing and/or forwarding user data. The processor 202 may manage local pipelines with at least one of: a dedicated API service for remote connection, and data collection (e.g., from the operating system).

According to some embodiments, executable code to be implemented by the processor 202 may be executed by another processor within the computer network 201. Execution of such code within computer network 201 may allow at least one of: a dedicated API service for remote connection, source code level data collection, and/or event based data collection.

In some embodiments, source level collection may include, similarly to local debugging, the user of computer network 201 specifying a source code position (e.g., a filename and line number) from which to collect the data, as well as what data to collect. The data collection may include a two-step process: stopping the program execution at the given point, for instance carried out using an interpreter's tracing mechanism (e.g., sys.settrace in Python code) or assembly/bytecode manipulation, whereupon the actual program may be changed, and collecting the desired data, for instance carried out by exposing program state to a scripting engine (e.g., similarly to JavaScript ™) and allowing a user to utilize configurable script to collect the data from the application and send it to the agent for further processing.

In some embodiments, global event collection may allow the user to specify a global event such as throwing an exception, writing to log, network events and/or traffic, CPU and/or memory thresholds, file access events and the like, and having the dedicated code (e.g., embedded within computer network 201) collect the data when it occurs. In a two-step process: the program execution may be stopped at the given event, for instance carried out using a predefined interface in the platform and/or using a code modification technique. The same data collection scripting engine may be executed, for instance also provided with event specific data In some embodiments, analysis and/or modification of data by processor 202 may be carried out at a separate environment (e.g., using virtualization) such that running programs may be unaffected.

Figure 2B:
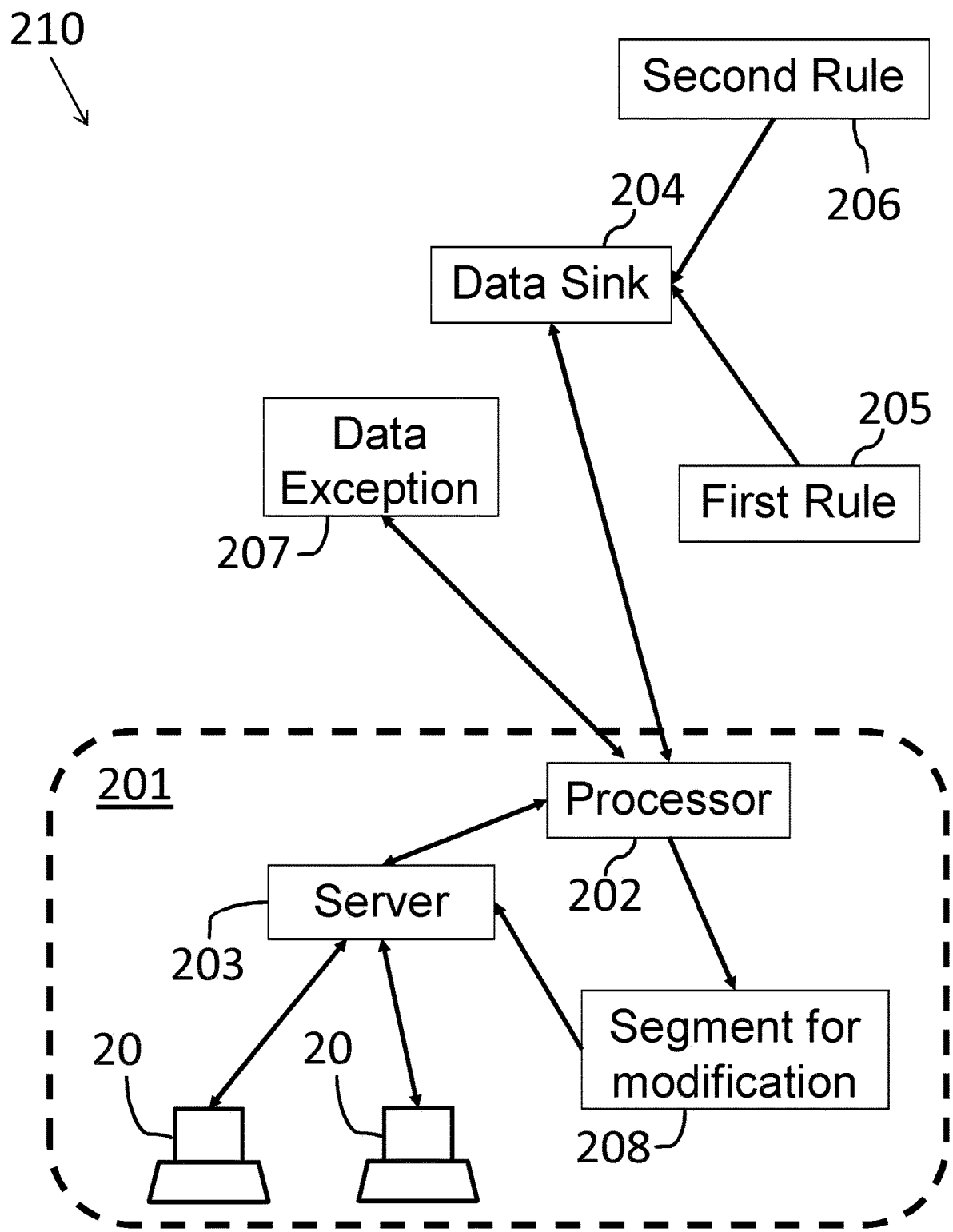

Reference is now made to FIG. 2B, which shows a block diagram of a system 210 for controlled data extraction in a computer network 201, according to some embodiments. In FIG. 2B, the direction of arrows may indicate the direction of information flow. In some embodiments, at least some elements of system 210 may have similar function as corresponding elements in system 200 (shown in FIG. 2A).

Processor 202 of system 210 may be embedded within computer network 201, for instance embedded as a dedicated server. In some embodiments, executable code corresponding to code implemented on processor 202 in system 200 (shown in FIG. 2A) may be implemented on processor 202 in system 210 (shown in FIG. 2B) such that upon detection of a data exception 207 a segment for modification 208 may be determined. In some embodiments, the at least one data sink 204 may be embedded within computer network 201. In some embodiments, the at least one data sink 204 may be external to the computer network 201.

According to some embodiments, data collection (e.g., by processor 202) may be carried out by application code editing, with code going through several steps when being transformed from source code to machine code, with at least one of the following steps: source code, abstract syntax trees (AST), assembly code, machine code. In some embodiments, such edits may be added and removed "on the fly" (e.g., during operation of a process on computer network 201) as needed for the data collection. In some embodiments, data collection (e.g., by processor 202) may be carried out by a framework debugger interface, including integration directly with the relevant software libraries, such that the integration may use a document callback and/or plugin interface.

Figure 3A:
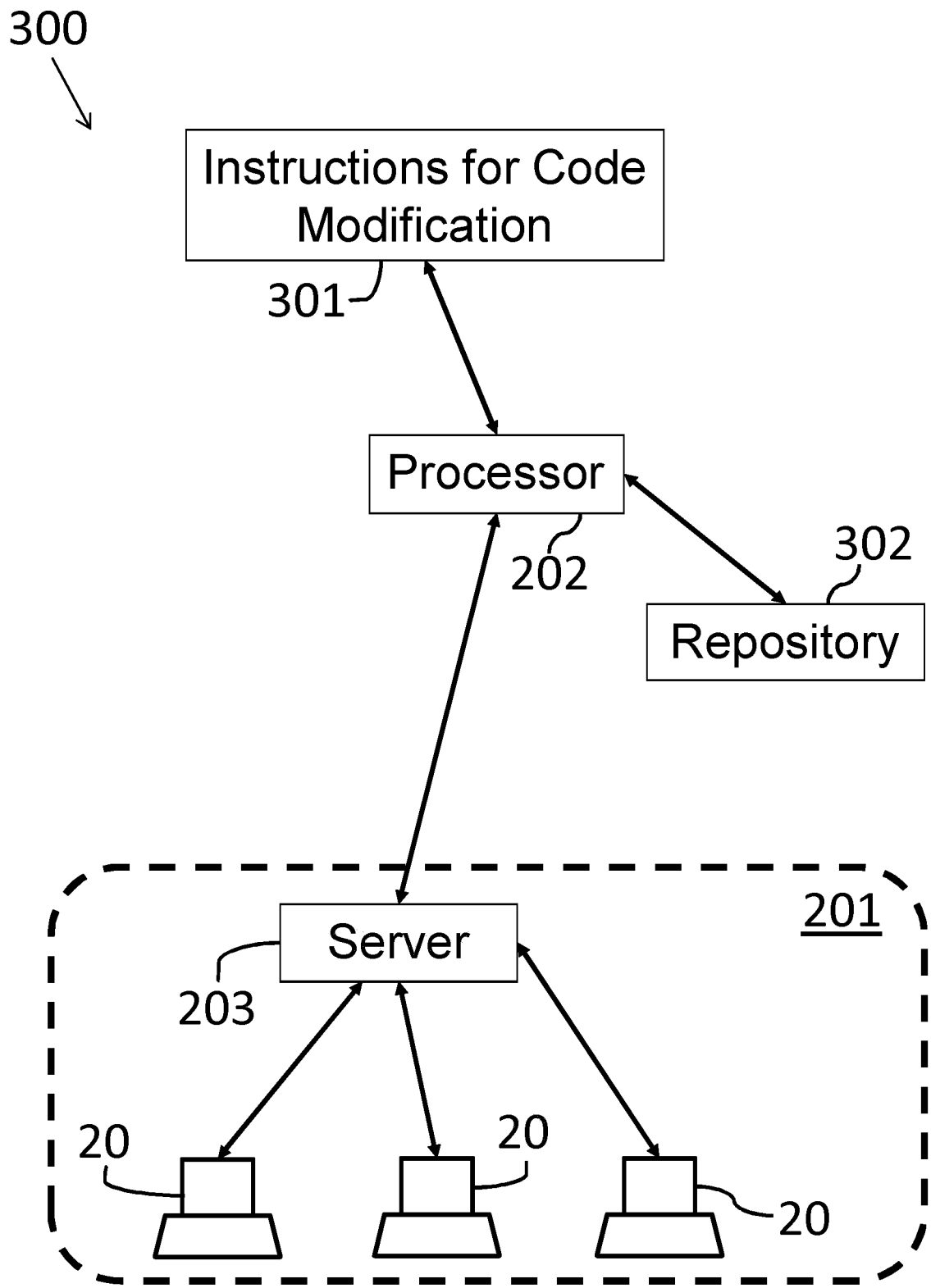
FIGS. 3A-3B show block diagrams of a system for controlled code modification in a computer network, according to some embodiments of the invention.

Reference is now made to FIG. 3A, which shows a block diagram of a system 300 for controlled code modification in a computer network 201, according to some embodiments. The system 300 may include a processor 202 in communication with at least one server 203 of computer network 201, such that data from various nodes 20 of computer network 201 may be received for monitoring and/or analysis by processor 202 via the at least one server 203.

According to some embodiments, processor 202 may send data to server 203, and thereby to nodes 20 of computer network 201, with instructions for code modifications 301, for instance instructions for code update. The source code implemented at computer network 201 may be stored at a dedicated repository 302 coupled to processor 202, such that when an update to the code is required (e.g., upon detection of bugs) the instructions for code modifications 301 may be directly sent to server 203 for implementation in computer network 201. It should be noted that in such way, there is no longer a need to stop programs running in computer network 201 in order to prepare appropriate instructions and implement an update. In some embodiments, instructions for code modification 301 may be injected into code in computer network 201 such that the corresponding process running in computer network 201 may be substantially unaffected.

In some embodiments, implementation of instructions for code modifications 301 in computer network 201 may be carried out in substantially real-time (e.g., in accordance with the rate of computer network 201) such that the corresponding process running in computer network 201 may be substantially unaffected. According to some embodiments, executable code to be implemented by the processor 202 may be executed by another processor within the computer network 201. Execution of such code within computer network 201 may allow a dedicated API service for remote connection.

Figure 3B:
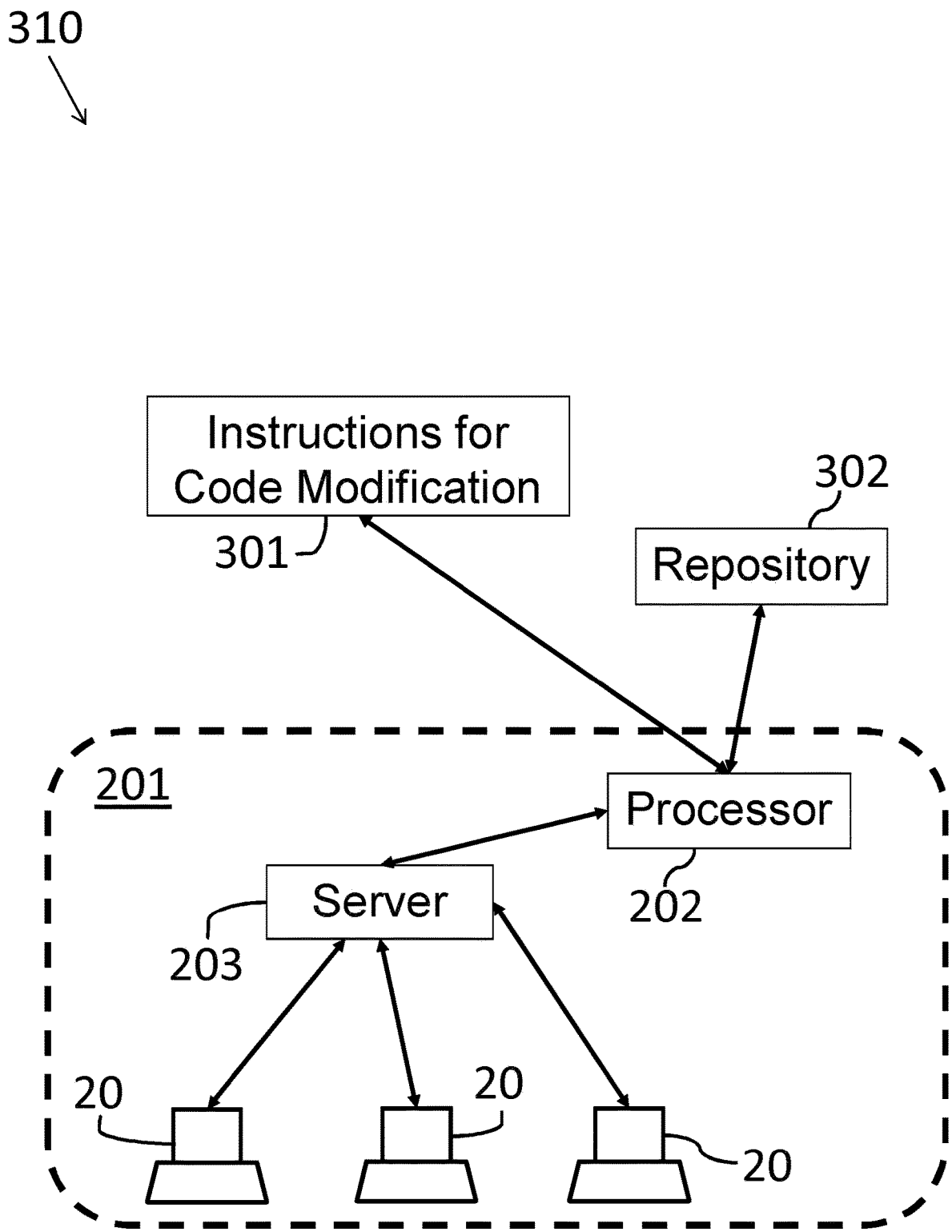

Reference is now made to FIG. 3B, which shows a block diagram of a system 310 for controlled data modification in a computer network 201, according to some embodiments. In some embodiments, at least some elements of system 310 may have similar function as corresponding elements in system 300 (shown in FIG. 3A).

Processor 202 of system 210 may be embedded within computer network 201, for instance embedded as a dedicated server. In some embodiments, executable code corresponding to code implemented on processor 202 in system 300 (shown in FIG. 3A), may be implemented on processor 202 in system 310 (shown in FIG. 3B).

According to some embodiments, processor 202 may send data to server 203, and thereby to nodes 20 of computer network 201, with instructions for code modifications 301, for instance instructions for code update. In some embodiments, source code implemented at computer network 201 may be stored at a dedicated repository 302 coupled to processor 202, such that, when an update to the code is required (e.g., upon detection of bugs), instructions for code modifications may be created and sent directly to server 203 for implementation in computer network 201.

Figure 4:
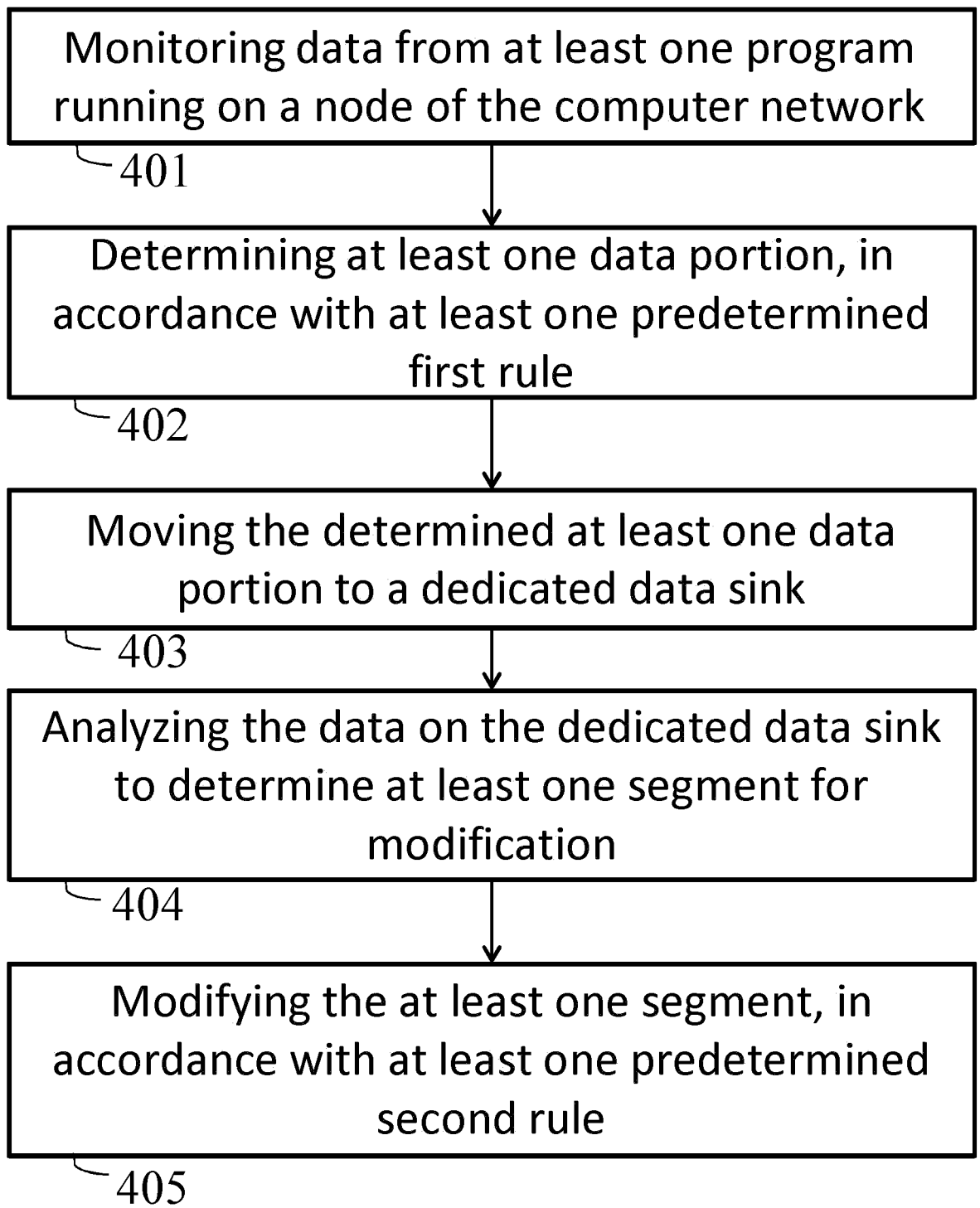
FIG. 4 is a flowchart of a method of controlled data extraction in a computer network, according to some embodiments of the invention.

Reference is now made to FIG. 4, which shows a flowchart of a method of controlled data extraction in a computer network, according to some embodiments. Data from at least one program running on a node 20 of the computer network 201 may be monitored 401, for instance by at least one processor 202.

In some embodiments, at least one data portion may be determined 402, in accordance with at least one predetermined first rule 205, for instance by processor 202. The determined at least one data portion may be moved 403 to a data sink 204, for instance by processor 202. In some embodiments, the data on the data sink 204 may be analyzed 404 to determine at least one segment for modification 208, for instance analyzed by processor 202. The at least one segment 208 may be modified 405, in accordance with at least one predetermined second rule 206, for instance by processor 202. In some embodiments, data portions determined in accordance with the at least one predetermined first rule 205 may be selected from a group consisting of: application and server events, code line execution, file access and calls. The at least one segment for modification 208 may include an event from the first rule 205. In some embodiments, the at least one first rule 205 may include a global event. The at least one predetermined first rule 205 may include at least one of: type of source code and location in source code to determine data exceptions 207. In some embodiments, an alert may be issued upon detection of at least one event from the first rule 205. In some embodiments, operation of the at least one node 20 may be stopped (e.g., by processor 202) upon detection of at least one event from the first rule 205.

In some embodiments, data collection may be modified without modifying the system of computer network 201, thereby providing agility, stability, and ease of use. In some embodiments, management of the data collection (e.g., by processor 202) as a separate system may allow various built in features such as monitoring, governance, compliance, etc.

The modified data may be sent (e.g., by processor 202) to the corresponding at least one node 20 of the computer network 201. The at least one data portion may include a data exception 207. The monitoring may be carried out on a dedicated node 20 of the computer network 201. In some embodiments, a dedicated processor may be embedded in the computer network 201, for instance to analyze the data therein.

According to some embodiments, a method of controlled real-time data extraction in a computer network 201 may include: monitoring, by a processor 202, data from at least one program running on a node 20 of the computer network 201 in real-time, determining at least one data portion, in accordance with at least one predetermined first rule 205, and moving the determined at least one data portion to a data sink 204, wherein the at least one program is not interrupted for a substantial time period (e.g., briefly interrupting the program and quickly restoring to normal operation), and wherein data portions determined in accordance with the at least one predetermined first rule 205 may be selected from a group consisting of: application and server events, code line execution, file access and calls.

According to some embodiments, updates to data collection may be performed immediately without requiring software updates. Updates to data collection may also be performed without changing the software state through redeployment and/or restart. According to some embodiments, data may be safely extracted if data extraction is prevented from jeopardizing the software system. Data may be collected from any software source, including a live software system inner state. Data may also be enriched at the source or through the pipeline to make it more valuable. According to some embodiments, data may be sent to any target system, within or external to computer network 201.

According to some embodiments, data targets may be easily switched on the fly, allowing technological freedom and reduces commercial lock-in costs. Data may be maintained fully structured throughout the pipeline, increasing its value and ease of processing. In some embodiments, the pipeline may be fully integrated end-to-end, saving time and money on setup and maintenance. The entire pipeline may be managed remotely from a single system, keeping all settings in sync and saving work on orchestration. According to some embodiments, the entire pipeline may be visible from a single pane of glass as a management console that presents data from multiple sources in a unified display, thereby allowing to easily understand and analyze it.

According to some embodiments, data compliance requirements may be implemented in the pipeline itself keeping data compliant for the variety of different systems it is stored in. Data may be tracked end-to-end, thereby allowing to know what each data items means. The pipelines may be monitored end-to-end, and errors or changes in data quality easily identifiable. Identical data may be sent to multiple systems, thereby keeping them in sync (unlike collecting the same data multiple time). In some embodiments, data may be archived in the pipeline to meet a variety of needs (e.g., legal obligations, later retransmission, etc.).

According to some embodiments, data collection rules may be codified and/or encrypted and shared between users of the system.

Figure 5:
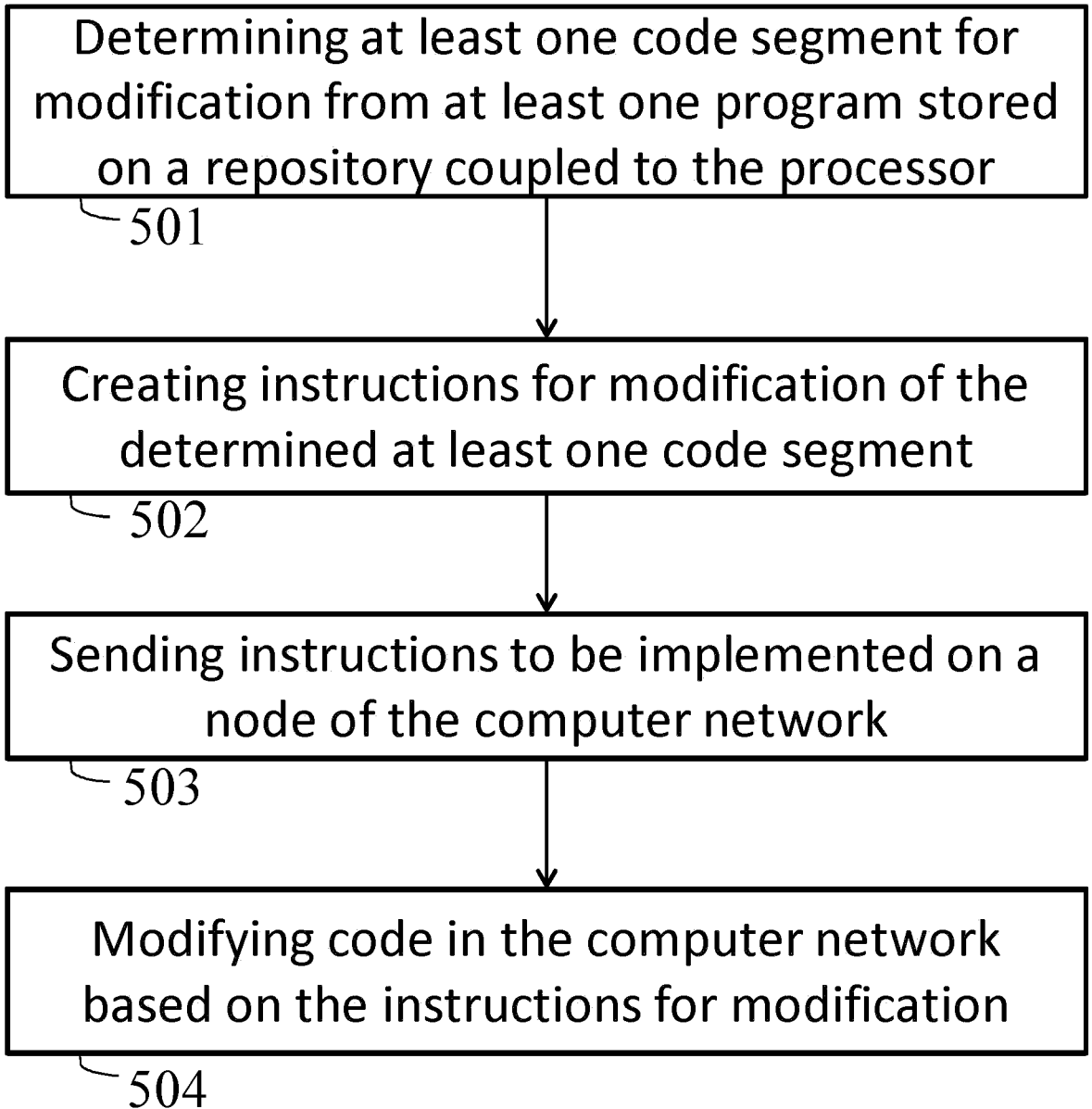
FIG. 5 is a flowchart of a method of controlled code modification in a computer network, according to some embodiments of the invention.

Reference is now made to FIG. 5, which shows a flowchart of a method of controlled code modification in a computer network, according to some embodiments. At least one code segment 208 for modification from at least one program may be determined 501, for instance by at least one processor 202, the at least one program running on a node 20 of the computer network 201.

In some embodiments, instructions for modification of the determined at least one code segment may be created 502, for instance by processor 202. Instructions to be implemented on a node of the computer network may be sent 503, for instance by processor 202. The code in the computer network 201 may be modified 504 based on the instructions for modification. In some embodiments, implementation of the at least one modified segment may be carried out in real-time while the corresponding process keeps running.

It should be noted that, with such data extraction systems as described above, it may be possible to extract and analyze data on/from various sources (e.g., servers) and modify the data in real-time, for instance in contrast to merely taking a "snapshot" of code for analysis.

According to some embodiments, the system 200 for controlled data extraction may include a unified and/or cross-platform framework (or core) with a set of software development tools (e.g., debugging tools) that are configured to assist in generation of multiple platform-specific applications. The cross-platform framework may be configured to collect any piece of data from a running application, for instance the platform may be operated by the system for controlled data extraction, without restarting and/or redeploying. For example, such system 200 may include a single framework that allows data extraction with multiple programming languages, thereby eliminating the need to generate separate frameworks for each programming language.

It should be noted that such cross-platform framework may create a single solution for all external computer systems to be integrated with the system 200 for controlled data extraction, while each external computer system may operate with a different programming language or framework (e.g., 'Python' ™, 'JVM' ™, 'NodeJS' ™ etc.), thus a single platform may be applicable to different frameworks (or languages). In some embodiments, the cross-platform framework may include multiple application programming interfaces (APIs) and employ at least one of the following techniques: tracing, hooking, bytecode-manipulation and debugger interfaces for the set of software development tools. The monitoring of the system 200 may be carried out with interchangeable bytecode-manipulation and/or tracing mechanisms in accordance with the specific framework of the user.

The cross-platform framework may be generated with a predetermined open source programming development language (e.g., 'Golang'). In some embodiments, the implementation of the open source programming development language may include monitoring and/or management of the cross-platform framework, for instance monitored remotely of the cross-platform framework. The cross-platform framework may be designed to enable predetermined open source programming development language (e.g., 'Golang') to work with different languages, for instance embedding 'Golang' into 'Java' ™ and/or 'Python' ™ and/or 'Node'.

In some embodiments, at least one of the following (global) events may be monitored: performance profiling (e.g., CPU or memory profiling), error instrumentation (e.g., to capture exceptions), logging web events (e.g., HTTP requests, domain name system (DNS) requests, etc.), application networking events (e.g., creation of addresses, network communication, etc.), file system events, network traffic monitoring and/or container instrumentation operation. The system 200 may be integrated with instrumentation application programming interfaces (both documented and undocumented) in order to identify events such as exception processing and CPU usage, across the supported frameworks (e.g., 'Python' ™, 'JVM' ™ and 'NodeJS' ™). System 200 may also be integrated with predetermined libraries using both extension interfaces as well as hooking in order to identify events such as logging operations, web operations and/or network actions.

According to some embodiments, the cross-platform framework may be designed to be configurable using existing dependency managers or packages (e.g., 'pip', 'npm', 'Maven', 'Gradle', etc.) with no compilation of the native code, thus reducing the need to identify dependencies of operating systems and/or of the framework level. The orchestration pipeline may be continuously revised in order to allow updates according to the requirement of each user.

According to some embodiments, system 200 may include a dynamic mechanism to allow simultaneous operation on two frameworks at the same time, while presenting a unified interface, with assisted decision-making ability that may independently select the most effective framework in accordance with the environment (e.g., based on code).

According to some embodiments, system 200 may collect data to forward it in a fully structured manner to a corresponding and/or remotely managed pipeline. Thus, creating the capability to transform and send the data to any target from the same control mechanism as used for collecting the data.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of controlled data extraction in a computer network, the method comprising:
   monitoring, by a processor, data from at least one program running on a node of the computer network;
   determining, by the processor, at least one data portion from the monitored data with a data exception, in accordance with at least one first rule,
   wherein data portions exceptions determined in accordance with the at least one first rule are selected upon identification of at least one of:
   application and server events, code line execution, file access and data calls;
   moving, by the processor, the determined at least one data portion exception to a data sink;
   analyzing, by the processor, the data on the data sink to determine at least one segment for modification; and
   modifying, by the processor, the at least one segment, in accordance with at least one second rule,
   wherein the modification of the at least one segment is carried out in real-time corresponding to the rate of the computer network;
   creating, by the processor, instructions for modification of the determined at least one code segment.

2. The method of claim 1, further comprising sending the modified data to the corresponding at least one node of the computer network.

3. The method of claim 1, wherein modifications of data exceptions in accordance with the at least one second rule are selected from: catching an exception, executing a line of code, skipping a line of code, and setting a variable's value.

4. The method of claim 1, wherein at least one segment for modification comprises an event identified in accordance with the at least one first rule.

5. The method of claim 1, further comprising embedding a dedicated processor in the computer network to analyze the data therein.

6. The method of claim 1, further comprising stopping operation of the at least one node upon detection of at least one event identified in accordance with the at least one first rule.

7. The method of claim 1, wherein the monitoring is carried out with at least one of: tracing mechanism, hooking, bytecode-manipulation and debugger interfaces, and wherein the bytecode-manipulation is interchangeable with the tracing mechanism.

8. The method of claim 1, wherein at least one of the following events is monitored: performance profiling, error instrumentation, logging web events, application networking events, file system events, network traffic monitoring and container instrumentation operation.

9. The method of claim 1, further comprising executing executable code by another processor in the computer network.

10. The method of claim 1, further comprising editing executable code during operation of a process on the computer network in real-time.

11. The method of claim 1, further comprising performing data collection by a framework debugger interface integrated with software libraries.

12. A system for controlled data extraction in a computer network, the system comprising:
    a processor; and
    at least one data sink, comprising at least one first rule and at least one second rule, wherein the processor is configured to:
    monitor data from at least one node of the computer network;
    determine at least one data exception, in accordance with the at least one first rule,
    wherein data exceptions are selected from a group consisting of:
    application and server events, code line execution, file access and calls;
    move the monitored data to the data sink;
    analyze the data on the data sink to determine at least one segment for modification; and
    modify the at least one segment in real-time corresponding to the rate of the computer network, wherein the modification is carried out in accordance with the at least one second rule;
    creating, by the processor, instructions for modification of the determined at least one code segment.

13. The system of claim 12, further comprising a dedicated processor embedded in the computer network to analyze the data therein.

14. The system of claim 12, wherein at least one segment for modification comprises an event identified in accordance with at least one first rule.

15. The system of claim 14, wherein the at least one first rule comprises at least one of type of source code and location in source code to determine data exceptions.

16. The system of claim 14, wherein the processor is configured to stop operation of the at least one node upon detection of at least one event identified in accordance with the at least one first rule.

17. The system of claim 12, wherein the processor is configured to monitor with at least one of: tracing mechanism, hooking, bytecode-manipulation and debugger interfaces, and wherein the bytecode-manipulation is interchangeable with the tracing mechanism.

18. The system of claim 12, wherein at least one of the following events is monitored by the processor: performance profiling, error instrumentation, logging web events, application networking events, file system events, network traffic monitoring and container instrumentation operation.

19. The system of claim 12, modifications of data exceptions in accordance with the at least one second rule are selected from: catching an exception, executing a line of code, skipping a line of code, and setting a variable's value.

20. A method of controlled code modification in a computer network, the method comprising:
 determining, by a processor, at least one code segment for modification from at least one program stored on a repository coupled to the processor;
 creating, by the processor, instructions for modification of the determined at least one code segment;
 sending, by the processor, instructions to be implemented on a node of the computer network; and
 modifying code in the computer network based on the instructions for modification, wherein implementation of the at least one modified segment is carried out in real-time while the corresponding process keeps running, and wherein the modification is carried out in real- time corresponding to the rate of the computer network.

* * * * *